United States Patent
Tambi et al.

(10) Patent No.: US 12,056,453 B2
(45) Date of Patent: Aug. 6, 2024

(54) SEMANTIC STRUCTURE IDENTIFICATION FOR DOCUMENT AUTOSTYLING

(71) Applicant: ADOBE INC., San Jose, CA (US)

(72) Inventors: Ritiz Tambi, San Francisco, CA (US); Rishav Agarwal, West Bengal (IN); Rishabh Purwar, Haryana (IN); Ajinkya Gorakhnath Kale, San Jose, CA (US); Sanyam Jain, Delhi (IN)

(73) Assignee: ADOBE INC., San Jose, CA (US)

( * ) Notice: Subject to any disclaimer, the term of this patent is extended or adjusted under 35 U.S.C. 154(b) by 324 days.

(21) Appl. No.: 17/658,855

(22) Filed: Apr. 12, 2022

(65) Prior Publication Data

US 2023/0325597 A1    Oct. 12, 2023

(51) Int. Cl.
| G06F 40/20 | (2020.01) |
| G06F 40/253 | (2020.01) |
| G06F 40/284 | (2020.01) |
| G06F 40/35 | (2020.01) |

(52) U.S. Cl.
CPC .......... *G06F 40/284* (2020.01); *G06F 40/253* (2020.01); *G06F 40/35* (2020.01)

(58) Field of Classification Search
CPC ...... G06F 40/284; G06F 40/253; G06F 40/35; G06F 40/103; G06F 40/30; G06F 40/186
See application file for complete search history.

(56) References Cited

U.S. PATENT DOCUMENTS

| 2020/0302016 A1* | 9/2020 | Aggarwal | G06V 30/414 |
| 2021/0182496 A1* | 6/2021 | Shi | G06F 40/30 |
| 2021/0357747 A1* | 11/2021 | Mukherjee | G06N 3/045 |
| 2022/0172725 A1* | 6/2022 | Khan Khattak | G10L 15/1822 |
| 2023/0315279 A1* | 10/2023 | Strader | G16H 10/20 715/716 |
| 2024/0028631 A1* | 1/2024 | Gong | G06F 16/3344 |

OTHER PUBLICATIONS

Method to Automatically Identify Logical Sections in an Unformatted Document, Disclosure Document related to Adobe Ref. P9748-US, 8 pages.

* cited by examiner

*Primary Examiner* — Abul K Azad

(74) *Attorney, Agent, or Firm* — F. CHAU & ASSOCIATES, LLC

(57) ABSTRACT

Systems and methods for natural language processing are described. Embodiments of the present disclosure receive plain text comprising a sequence of text entities; generate a sequence of entity embeddings based on the plain text, wherein each entity embedding in the sequence of entity embeddings is generated based on a text entity in the sequence of text entities; generate style information for the text entity based on the sequence of entity embeddings; and generate a document based on the style information.

13 Claims, 12 Drawing Sheets

SEMANTIC STRUCTURE IDENTIFICATION FOR DOCUMENT AUTOSTYLING

BACKGROUND

The following relates generally to natural language processing, and more specifically to content autostyling using machine learning. Natural language processing (NLP) refers to using computers to interpret or generate natural language. In some cases, NLP tasks involve assigning label data such as grammatical information to words or phrases within a natural language expression. Some NLP systems use neural networks or statistical models which make soft, probabilistic decisions based on attaching real-valued weights to input features. These models can express the relative probability of multiple answers. A variety of different classes of machine-learning algorithms have been applied to NLP tasks. Content autostyling is a field within NLP that involves identifying structure entities (e.g., headings, sections) in documents.

Conventional text editors are not able to automatically identify structural entities (e.g., sections) and incorporate style effects based on plain text input. Thus, to format documents users typically start with plain text and manually modify or stylize different sections such as converting certain text to heading or a bulletin point. Therefore, there is a need in the art for an improved text processing system that can efficiently and accurately perform structure identification and content autostyling for plain text.

SUMMARY

The present disclosure describes systems and methods for natural language processing. Embodiments of the present disclosure include a text processing apparatus configured to predict style information for each text entity in a sequence of text entities and generate a formatted document based on the style information. In an embodiment, a machine learning model of the text processing apparatus creates a sequence of entity embeddings representing entities from plain text (e.g., one text entity embedding for each sentence), and then uses a subsequent sequential neural network to generate style information for each text entity (i.e., whether it is a header, a paragraph, a list element, or other class). In some examples, a text entity includes one or more sentences or segments. In some embodiments, the lower layer of the machine learning model and the upper layer of the machine learning model comprise a different number of transformer layers and attention heads.

A method, apparatus, and non-transitory computer readable medium for content autostyling are described. One or more embodiments of the method, apparatus, and non-transitory computer readable medium include receiving plain text comprising a sequence of text entities; generating a sequence of entity embeddings based on the plain text, wherein each entity embedding in the sequence of entity embeddings is generated based on a text entity in the sequence of text entities; generating style information for the text entity based on the sequence of entity embeddings; and generating a document that includes the plain text formatted according to the style information.

A method, apparatus, and non-transitory computer readable medium for training a machine learning model are described. One or more embodiments of the method, apparatus, and non-transitory computer readable medium include receiving training data including plain text comprising a sequence of text entities and style annotation information for the sequence of text entities; generating a sequence of entity embeddings based on the plain text using a lower layer of a machine learning model, wherein each entity embedding in the sequence of entity embeddings is generated based on a text entity in the sequence of text entities; generating style information for the text entity based on the sequence of entity embeddings using an upper layer of the machine learning model; and updating the machine learning model based on the style annotation information and the generated style information.

An apparatus and method for content autostyling are described. One or more embodiments of the apparatus and method include a lower layer of a machine learning model configured to generate a sequence of entity embeddings based on a sequence of text entities in plain text, wherein each entity embedding in the sequence of entity embeddings is generated based on a text entity in the sequence of text entities; an upper layer of the machine learning model configured to generate style information for the text entity based on the sequence of entity embeddings; and a document generation component configured to generate a document based on the style information.

DETAILED DESCRIPTION

Figure 1:
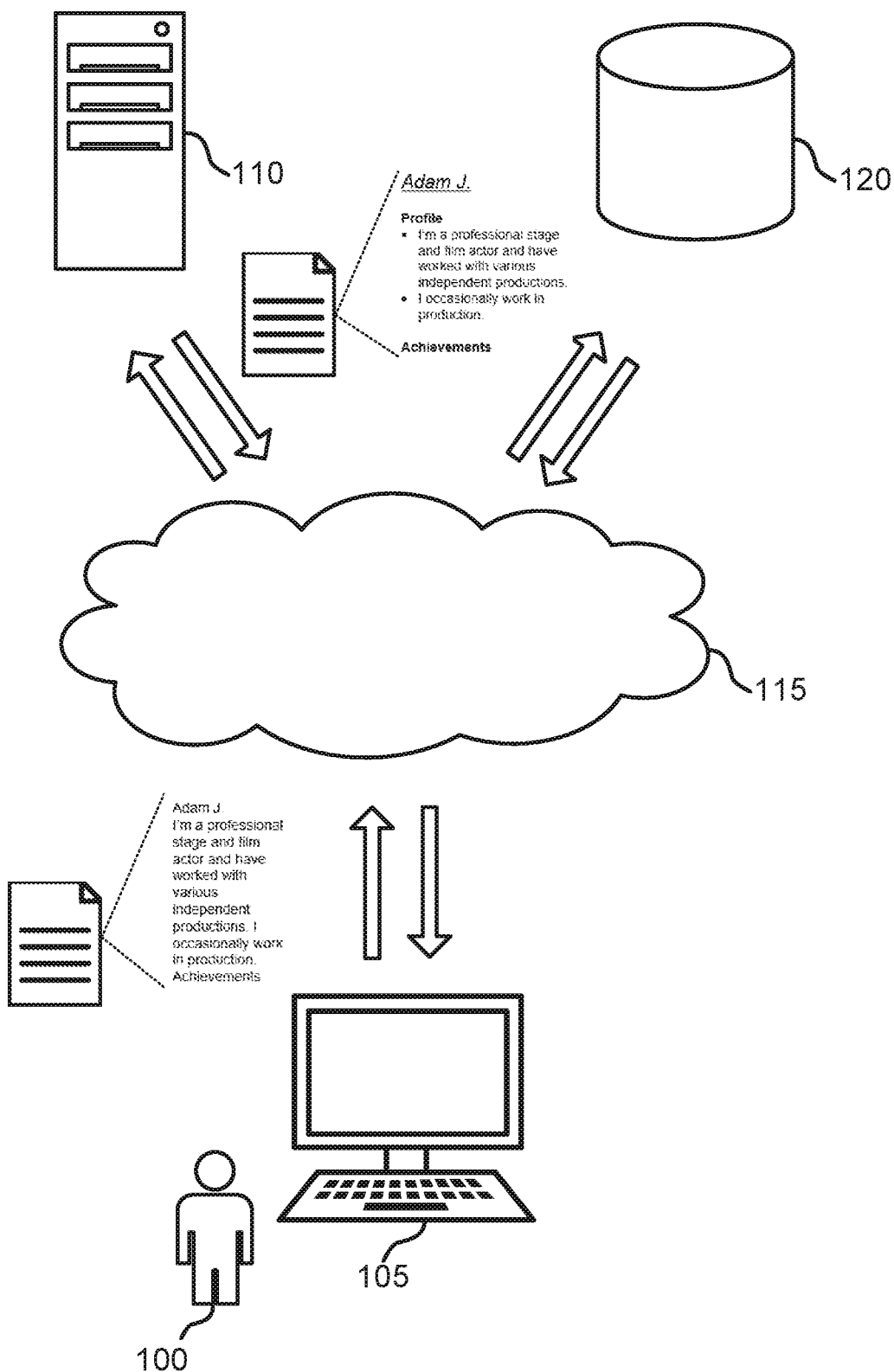
FIG. 1 shows an example of a text processing system according to aspects of the present disclosure.

The present disclosure describes systems and methods for natural language processing. Embodiments of the present disclosure include a text processing apparatus configured to predict style information for each text entity in a sequence of text entities and generate a formatted document based on the style information. In an embodiment, a machine learning model of the text processing apparatus creates a sequence of entity embeddings representing entities from plain text (e.g., one text entity embedding for each sentence), and then uses a subsequent sequential neural network to generate style information for each text entity (i.e., whether it is a header, a paragraph, a list element, or other class). In some examples, a text entity includes one or more sentences or segments.

In some embodiments, the lower layer of the machine learning model and the upper layer of the machine learning model comprise a different number of transformer layers and attention heads.

Conventional text processing systems identify sections based on a structured document having a well-defined layout. These systems depend on layout signals such as font styles, font size, text indentation, text coordinates, and other layout information. However, conventional text editors are not able to automatically identify different structural entities (e.g., sections) in a document. Users have to copy plain text from the document and manually modify different sections to incorporate style information. For example, users manually convert certain text to a heading, a paragraph, or a list element.

Embodiments of the present disclosure include a text processing apparatus that identify structural classes or annotations based on plain text at inference time. The plain text does not have any formatting or style annotations. The text processing apparatus is trained to output style information which is a probability value for each of a set of style classes (e.g., heading, paragraph, list, other).

By using a transformer-over-transformer structure identification model trained on plain text, one or more embodiments of the present disclosure create a sequence of embeddings representing text entities from plain text (e.g., one entity embedding for each sentence), and then uses a subsequent sequential neural network to generate style information for each text entity.

In some examples, a lower layer of a machine learning model is configured to generate a sequence of entity embeddings based on a sequence of text entities in plain text. Each entity embedding in the sequence of entity embeddings is generated based on a text entity in the sequence of text entities. An upper layer of the machine learning model is configured to generate style information for the text entity based on the sequence of entity embeddings and determine whether the text entity is a header, a paragraph, a list element, or other class). The lower layer of the machine learning model and the upper layer of the machine learning model comprise a different number of attention heads.

Unlike conventional text editors that rely on document structure and formatting signals to identify sections in a document, the text processing apparatus of the present disclosure can perform automatic styling and semantic structure identification given exclusive plain text. That is, an unstructured document without document structure annotations. The lower layer and upper layer of the machine learning model comprise transformer layers that capture context. Training the machine learning model involves identifying a set of text windows from plain text where each text window comprises one or more text entities. This way, the machine learning model is trained to identify structure classes within a section of the plain text exclusive of other sections because the context is captured within a window. In some cases, a maximum window size is predetermined (e.g., 512 tokens)

In one embodiment, the machine learning model is trained using supervised learning. A PDF extract service obtains structural annotations from structured and formatted PDFs to create weak-labeled training data. The output from PDF extract service contains plain text and corresponding structure entities associated with the plain text (e.g., title, heading, list, paragraph).

The machine learning model is trained to generate text annotated with structural classes. Then, users can select a style layout from existing style templates which is then applied to headings, lists, paragraphs, and other classes identified by the machine learning model to obtain an auto-styled document. Accordingly, users can focus on editing content with automatic styling from the text processing apparatus. Users do not have to manually convert text to incorporate style information and editing efficiency is increased.

Embodiments of the present disclosure may be used in the context of natural language processing applications. For example, a text editor based on the present disclosure takes plain text as input, identifies styling information, and produces a formatted document based on the styling information. For example, the formatted document includes paragraph, list, and/or heading element, as shown in FIG. 6. An example application of the inventive concept in the text processing context is provided with reference to FIG. 5. Details regarding the architecture of an example text processing apparatus are provided with reference to FIGS. 1-4. Example processes for text processing are provided with reference to FIGS. 6-9. Example training processes are described with reference to FIGS. 10-12.

Network Architecture

In FIGS. 1-4, an apparatus and method for content auto-styling are described. One or more embodiments of the apparatus and method include a lower layer of a machine learning model configured to generate a sequence of entity embeddings based on a sequence of text entities in plain text, wherein each entity embedding in the sequence of entity embeddings is generated based on a text entity in the sequence of text entities; an upper layer of the machine learning model configured to generate style information for the text entity based on the sequence of entity embeddings; and a document generation component configured to generate a document based on the style information.

Some examples of the apparatus and method further include a training component configured to receive training data including the plain text comprising the sequence of text entities and style annotation information for the sequence of text entities, and to update the machine learning model based on the style annotation information and the generated style information. In some examples, the lower layer of the machine learning model and the upper layer of the machine learning model comprise a different number of attention heads.

Some examples of the apparatus and method further include a template selection component configured to select a template from a plurality of document templates, wherein the document is based on the selected template.

Some examples of the apparatus and method further include a document extraction component configured to perform text recognition on a styled document to obtain the plain text, to perform style extraction on the styled document to obtain style annotation information, or both.

FIG. 1 shows an example of a text processing system according to aspects of the present disclosure. The example shown includes user 100, user device 105, text processing apparatus 110, cloud 115, and database 120. Text processing apparatus 110 is an example of, or includes aspects of, the corresponding element described with reference to FIG. 2.

In an example of FIG. 1, user 100 provides plain text to text processing apparatus 110, e.g., via user device 105 and cloud 115. In some examples, the plain text is extracted from a PDF using a text extraction tool. Text processing apparatus 110 takes a sequence of text entities as input and generates a sequence of entity embeddings based on the plain text. Each entity embedding in the sequence of entity embeddings is generated based on a text entity in the sequence of text entities. In some examples, a text entity includes one or more sentences or segments (e.g., a paragraph from the plain text).

Text processing apparatus 110 generates style information (e.g., heading, list, paragraph, and/or other structural class) for the text entity based on the sequence of entity embeddings. Text processing apparatus 110 can identify structural annotations or classes based solely on the plain text. That is, text processing apparatus 110 is not dependent on document structure-related supervision signals. Text processing apparatus 110 generates a formatted document based on the style information. In some cases, image processing apparatus 610 returns the formatted document to user 100 via user device 105 and cloud 115.

Text processing apparatus 110 includes a transformer-over-transformer structure identification model (i.e., a machine learning model). The machine learning model is trained using weak-labeled datasets based on supervised learning. The machine learning model includes a lower layer comprising a base transformer and an upper layer comprising two transformer layers. The lower layer generates the sequence of entity embeddings based on the sequence of text entities in the plain text. The upper layer generates the style information. The process of using text processing apparatus 110 is further described with reference to FIG. 5.

User device 105 may be a personal computer, laptop computer, mainframe computer, palmtop computer, personal assistant, mobile device, or any other suitable processing apparatus. In some examples, user device 105 includes software that incorporates a text processing application (e.g., a text editor). In some examples, the text editing application on user device 105 may include functions of text processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Text processing apparatus 110 includes a computer implemented network comprising a document generation component, template selection component, and a document extraction component. Text processing apparatus 110 may also include a processor unit, a memory unit, an I/O module, and a training component. The training component is used to train a machine learning model (or a text processing network). Additionally, text processing apparatus 110 can communicate with database 120 via cloud 115. In some cases, the architecture of the text processing network is also referred to as a network, a structure identification model, or a network model. Further detail regarding the architecture of text processing apparatus 110 is provided with reference to FIGS. 2-4. Further detail regarding the operation of text processing apparatus 110 is provided with reference to FIGS. 5-9.

In some cases, text processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
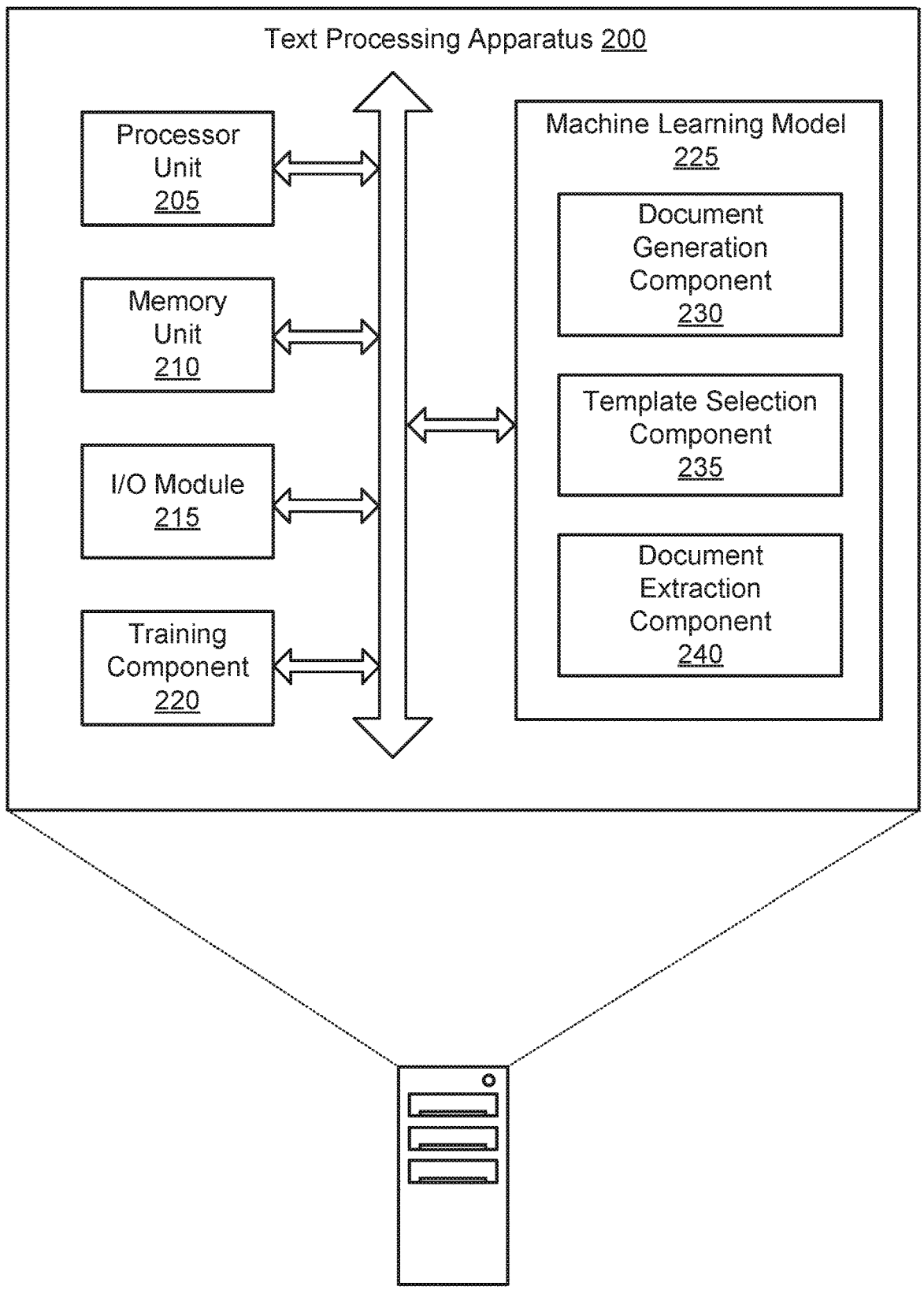
FIG. 2 shows an example of a text processing apparatus according to aspects of the present disclosure.

FIG. 2 shows an example of a text processing apparatus 200 according to aspects of the present disclosure. The example shown includes text processing apparatus 200, processor unit 205, memory unit 210, I/O module 215, training component 220, and machine learning model 225. Text processing apparatus 200 is an example of, or includes aspects of, the corresponding element described with reference to FIG. 1. In one embodiment, machine learning model 225 includes document generation component 230, template selection component 235, and document extraction component 240. Machine learning model 225 comprises a lower layer and an upper layer.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, text processing apparatus 200 includes a computer implemented artificial neural network (ANN) for predicting style information (e.g., paragraph, list, heading, etc.) and generating a formatted document based on the style information. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 220 receives training data including plain text including a sequence of text entities and style annotation information for the sequence of text entities. In some examples, training component 220 updates the machine learning model 225 based on the style annotation information and the generated style information. In some examples, training component 220 computes a cross-entropy loss function based on the style information and the style annotation information, where parameters of the machine learning model 225 are updated based on the cross-entropy loss function. Training component 220 is an example of, or includes aspects of, the corresponding element described with reference to FIG. 11.

According to some embodiments, machine learning model 225 receives plain text including a sequence of text entities. In some examples, a lower layer of machine learning model 225 generates a sequence of entity embeddings based on the plain text, where each entity embedding in the sequence of entity embeddings is generated based on a text entity in the sequence of text entities. An upper layer of machine learning model 225 generates style information for the text entity based on the sequence of entity embeddings.

In some examples, the lower layer of machine learning model 225 divides the text entity of the sequence of text entities into a sequence of tokens. The lower layer of machine learning model 225 generates a token embedding for a token in the sequence of tokens, where the entity embedding is based on the token embedding. In some examples, the lower layer of machine learning model 225 generates a position embedding for the token, where the entity embedding is based on the position embedding. In some examples, the lower layer of machine learning model 225 adds a class identification token to the sequence of tokens, where the entity embedding is based on the class identification token.

In some examples, the lower layer of machine learning model 225 identifies a set of segment delimiters in the text entity of the sequence of text entities. The lower layer of machine learning model 225 divides the text entity into a set of segments based on the set of segment delimiters. The lower layer of machine learning model 225 generates a segment embedding for a segment of the set of segments, where the entity embedding is based on the segment embedding. In some examples, the style information includes a probability value for each of a set of style classes.

According to some embodiments, a lower layer of machine learning model 225 is configured to generate a sequence of entity embeddings based on a sequence of text entities in plain text, wherein each entity embedding in the sequence of entity embeddings is generated based on a text entity in the sequence of text entities. In some examples, the lower layer of the machine learning model 225 and the upper layer of the machine learning model 225 include a different number of attention heads. Machine learning model 225 is an example of, or includes aspects of, the corresponding element described with reference to FIGS. 3 and 11.

According to some embodiments, document generation component 230 generates a document based on the style information. In some examples, document generation component 230 selects a style for the text entity. Document generation component 230 generates a style tag for the text entity based on the selected style, where the document includes the style tag. Document generation component 230 is an example of, or includes aspects of, the corresponding element described with reference to FIG. 4.

According to some embodiments, template selection component 235 selects a template from a set of document templates, where the document is based on the selected template. Template selection component 235 is an example of, or includes aspects of, the corresponding element described with reference to FIG. 4.

According to some embodiments, document extraction component 240 identifies a set of entity delimiters in the plain text. In some examples, document extraction component 240 divides the plain text into a set of text entities based on the set of entity delimiters, where the sequence of text entities includes an ordering of the set of text entities. In some examples, the plain text does not include style annotations. In some examples, the set of entity delimiters includes, but not limited to, breaks, periods, semicolons, or other punctuations.

According to some embodiments, document extraction component 240 identifies the plain text and the style annotation information from a styled document. In some examples, document extraction component 240 performs text recognition on the styled document to obtain the plain text. In some examples, document extraction component 240 performs style extraction on the styled document to obtain the style annotation information.

According to some embodiments, document extraction component 240 is configured to perform text recognition on a styled document to obtain the plain text, to perform style extraction on the styled document to obtain style annotation information, or both.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
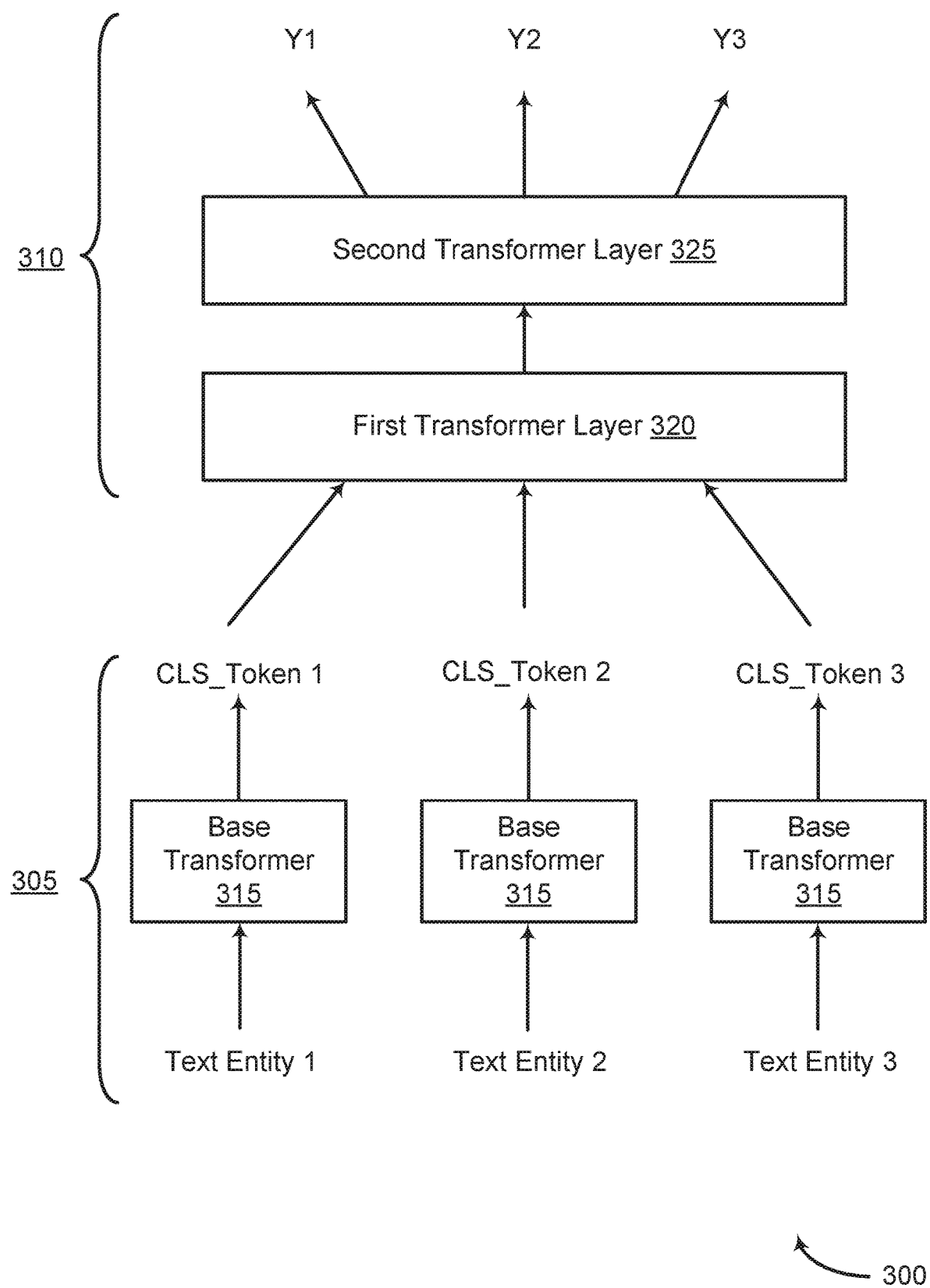
FIG. 3 shows an example of a machine learning model according to aspects of the present disclosure.

FIG. 3 shows an example of a machine learning model 300 according to aspects of the present disclosure. FIG. 3 shows further illustration of machine learning model 225 of FIG. 2. The example shown includes machine learning model 300, lower layer 305, upper layer 310, base transformer 315, first transformer layer 320, and second transformer layer 325. Machine learning model 300 is an example of, or includes aspects of, the corresponding element described with reference to FIGS. 2 and 11. According to an embodiment, machine learning model 300 includes lower layer 305 and upper layer 310. In some cases, machine learning model 300 may also be referred to as a structure identification model.

In some embodiments, base transformer 315 is Bert-Base Cased model pretrained on non-domain specific datasets (e.g., Common Crawl, Wikipedia etc). In some examples, base transformer 315 includes 12 layers, 12 attention heads, 768 embedding dimensions. Bert model embeddings for each token are a sum of token embeddings, segmentation embeddings, and position embeddings. Detail regarding generating token embeddings, segmentation embeddings, and position embeddings will be described in greater detail in FIG. 8.

In some examples, base transformer 315 is a Bert-Base model with 12 encoder layers. Each encoder layer of base transformer 315 is a transformer layer with multi-headed self-attention, layer normalization, and a feed forward (FF) layer with embeddings size 768. Each encoder layer is configured to have 12 attention heads. 0.1 dropout probability and max position embeddings of size 512 are used.

In some cases, alternating segment embeddings (e.g., $E_A E_A E_A E_A E_B E_B E_B E_B E_A E_A E_A E_A E_B E_B E_B E_B$) are generated during joint training for multiple segments (i.e., sentence or paragraph). The alternate embeddings include more than 2 segments in the same window. The alternating segment embeddings are used to distinguish between separate segments when computing attention. These embeddings are captured by the token for every segment.

According to an embodiment, base transformer 315 takes a text window comprising one or more entities. Base transformer 315 generates an entity embedding for each text entity. The entity embedding is then input to upper layer 310 of machine learning model 300. In some examples, text entity 1 is input to base transformer 315, which generates an entity embedding corresponding to Text Entity 1 (i.e., denoted by CLS_Token 1). Text Entity 2 is input to base transformer 315, which generates an entity embedding corresponding to Text Entity 2 (i.e., denoted by CLS_Token 2). Upper layer 310 may be referred to as the top-transformer layer.

According to an embodiment, upper layer 310 includes two transformer inter-encoder layers with dimensions 768 followed by a softmax layer (e.g., a softmax function). The two layers attend over token embeddings from lower layer 305 and softmax layer outputs the final prediction. In some examples, the machine learning model outputs a prediction from four classes (i.e., heading, list, paragraph, and other). A softmax function is used as the activation function of a neural network to normalize the output of the network to a probability distribution over predicted output classes. After applying the softmax function, each component of the feature map is in the interval (0, 1) and the components add up to one. These values are interpreted as probabilities. In FIG. 3, Y1 prediction corresponds to CLS_Token 1. Y2 prediction corresponds to CLS_Token 2. Y3 prediction corresponds to CLS_Token 3.

In some examples, upper layer 310 of machine learning model 300 includes two transformer layers with the same internal layout as the encoder layers of lower layer 305. The difference is in number of attention heads per encoder layer.

First transformer layer 320 has four attention heads. Second transformer layer 325 has four attention heads.

Figure 4:
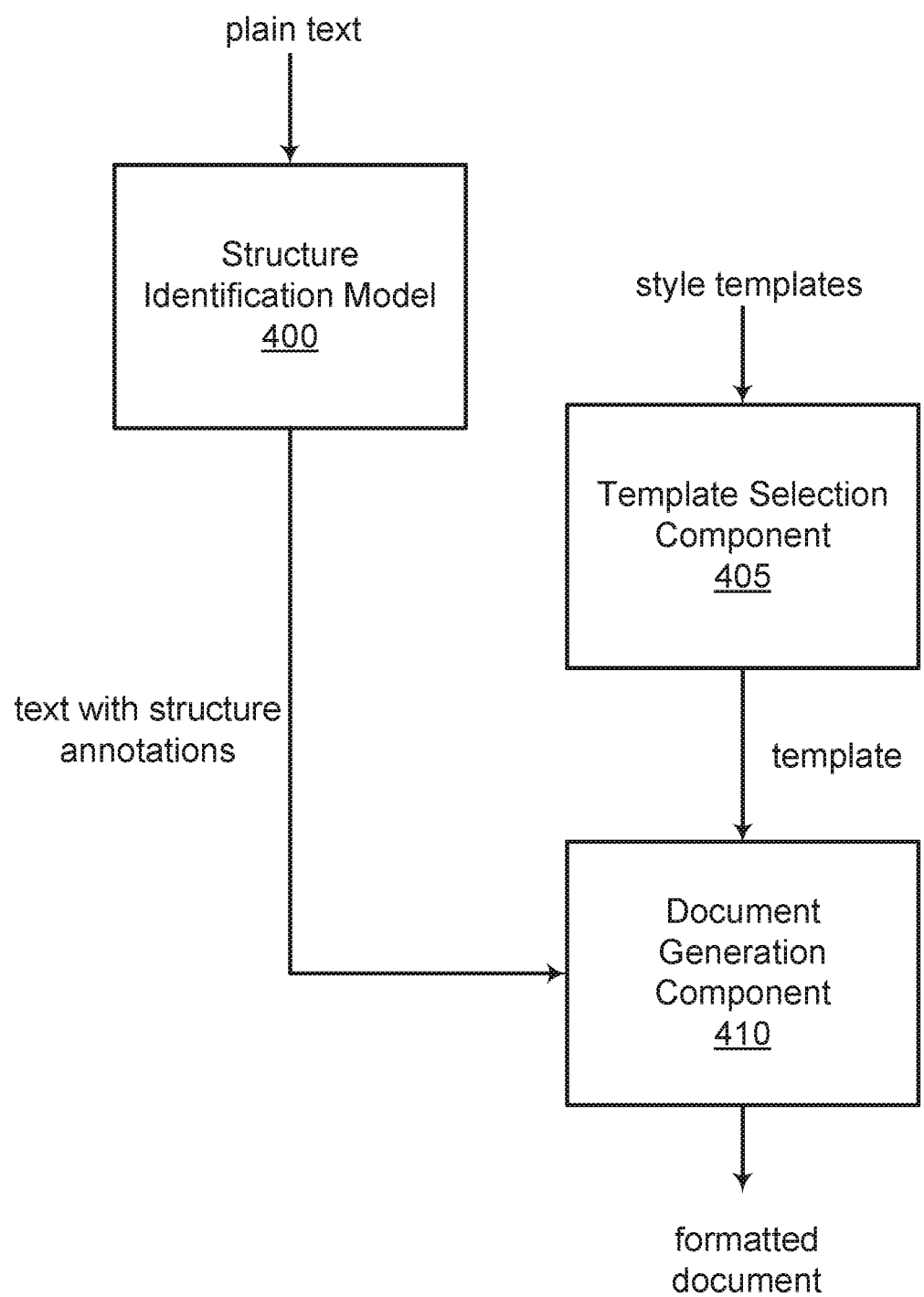
FIG. 4 shows an example of text processing according to aspects of the present disclosure.

FIG. 4 shows an example of text processing according to aspects of the present disclosure. In some cases, structure identification model 400 refers to machine learning model 300 or is considered a component of machine learning model 300. The example shown includes structure identification model 400, template selection component 405, and document generation component 410.

As illustrated in FIG. 4, plain text is input to structure identification model 400. In some cases, structure identification model 400 refers to machine learning model 300 of FIG. 3. Structure identification model 400 generates text with structure annotations (i.e., style information). In some examples, structure annotations or structural classes include heading, list, paragraph, and other structures.

Template selection component 405 is configured to select a template from a set of document templates or style templates. The formatted document is based on the selected template. Template selection component 405 is an example of, or includes aspects of, the corresponding element described with reference to FIG. 2.

The selected template is input to document generation component 410. Document generation component 410 is configured to generate the formatted document based on the structural classes (i.e., style information). In some examples, users can select a style layout from existing presets which is then applied to headings, lists, paragraph, and other structures to obtain an auto-styled output (i.e., formatted document). Document generation component 410 is an example of, or includes aspects of, the corresponding element described with reference to FIG. 2.

Text Processing

In FIGS. 5-9, a method, apparatus, and non-transitory computer readable medium for content autostyling are described. One or more embodiments of the method, apparatus, and non-transitory computer readable medium include receiving plain text comprising a sequence of text entities; generating a sequence of entity embeddings based on the plain text, wherein each entity embedding in the sequence of entity embeddings is generated based on a text entity in the sequence of text entities; generating style information for the text entity based on the sequence of entity embeddings; and generating a document based on the style information.

Some examples of the method, apparatus, and non-transitory computer readable medium further include identifying a plurality of entity delimiters in the plain text. Some examples further include dividing the plain text into a plurality of text entities based on the plurality of entity delimiters, wherein the sequence of text entities includes an ordering of the plurality of text entities. In some examples, the plain text does not include style annotations.

Some examples of the method, apparatus, and non-transitory computer readable medium further include dividing the text entity of the sequence of text entities into a sequence of tokens. Some examples further include generating a token embedding for a token in the sequence of tokens, wherein the entity embedding is based on the token embedding.

Some examples of the method, apparatus, and non-transitory computer readable medium further include generating a position embedding for the token, wherein the entity embedding is based on the position embedding.

Some examples of the method, apparatus, and non-transitory computer readable medium further include adding a class identification token to the sequence of tokens, wherein the entity embedding is based on the class identification token.

Some examples of the method, apparatus, and non-transitory computer readable medium further include identifying a plurality of segment delimiters in the text entity of the sequence of text entities. Some examples further include dividing the text entity into a plurality of segments based on the plurality of segment delimiters. Some examples further include generating a segment embedding for a segment of the plurality of segments, wherein the entity embedding is based on the segment embedding.

In some examples, the style information includes a probability value for each of a plurality of style classes. Some examples of the method, apparatus, and non-transitory computer readable medium further include selecting a style for the text entity. Some examples further include generating a style tag for the text entity based on the selected style, wherein the document includes the style tag.

Some examples of the method, apparatus, and non-transitory computer readable medium further include selecting a template from a plurality of document templates, wherein the document is based on the selected template.

Figure 5:
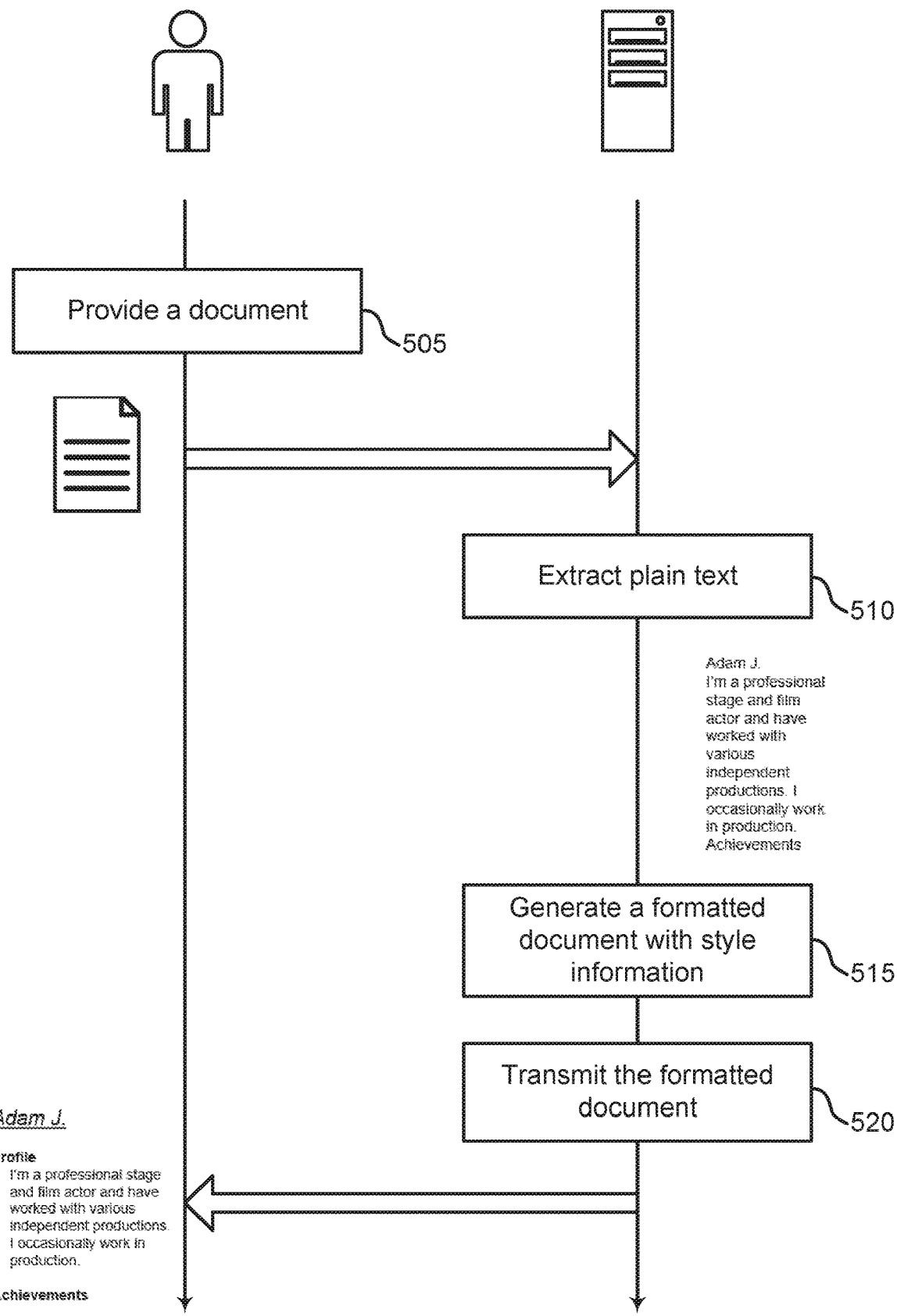
FIG. 5 shows an example of content autostyling application according to aspects of the present disclosure.
Figure 6:
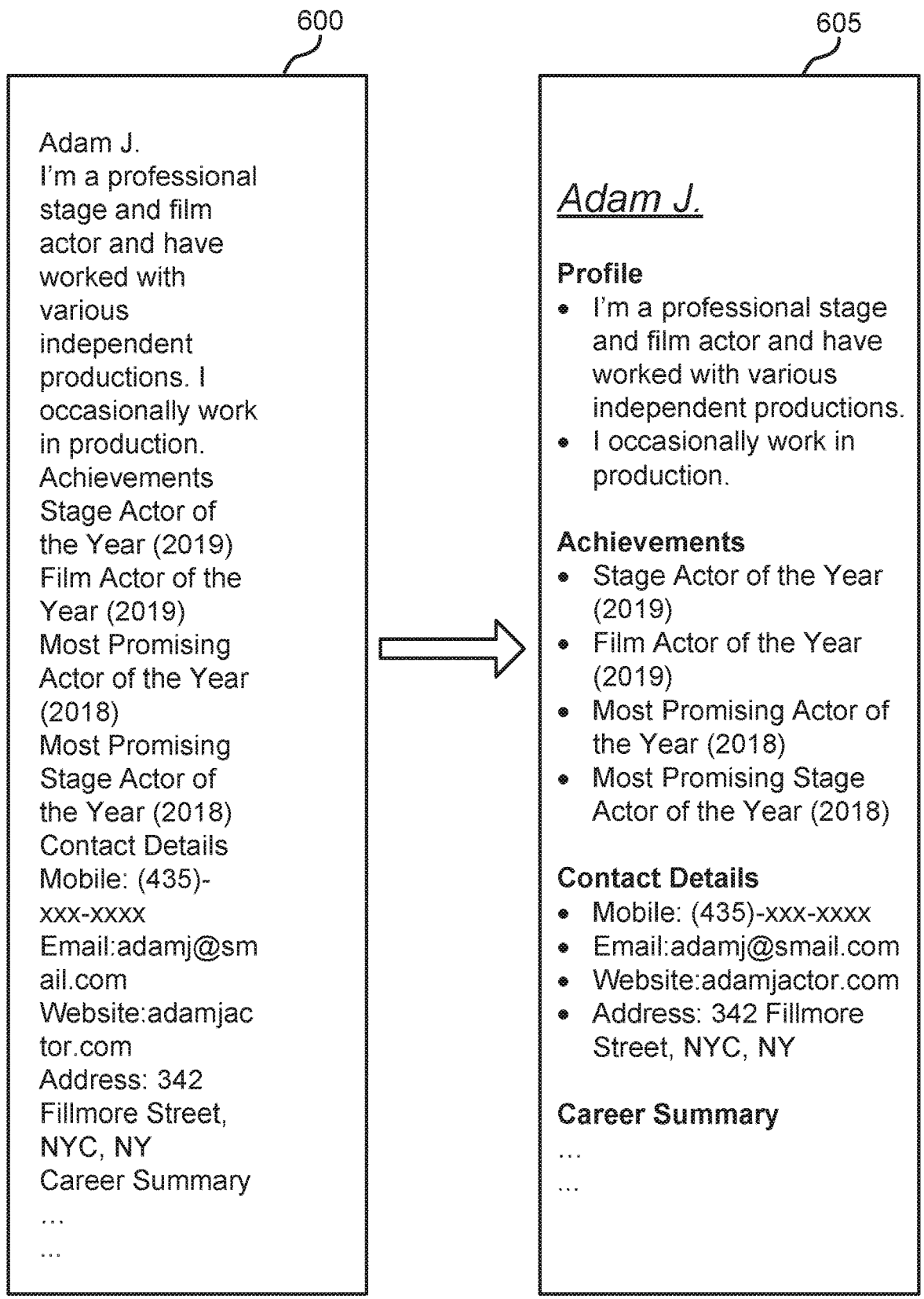
FIG. 6 shows an example of content autostyling according to aspects of the present disclosure.

FIG. 5 shows an example of content autostyling application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the user provides a document. In some cases, the operations of this step refer to, or may be performed by, a user as described with reference to FIG. 1. In some examples, the document is a PDF containing text information. The user is interested in editing the content of the document.

At operation 510, the system extracts plain text. In some cases, the operations of this step refer to, or may be performed by, a text processing apparatus as described with reference to FIGS. 1 and 2. In some examples, the plain text is extracted from the document.

At operation 515, the system generates a formatted document with style information. In some cases, the operations of this step refer to, or may be performed by, a text processing apparatus as described with reference to FIGS. 1 and 2. In an embodiment, the text processing apparatus is configured to predict style information or structural classes based on the plain text. The text processing apparatus generates a formatted document based on the plain text and the predicted structural classes. The text processing apparatus converts plain text to styled text based on structural classes such as heading, paragraph, list, and/or other.

At operation 520, the system transmits the formatted document. In some cases, the operations of this step refer to, or may be performed by, a text processing apparatus as described with reference to FIGS. 1 and 2. The user can focus on editing the content of the formatted document.

FIG. 6 shows an example of content autostyling according to aspects of the present disclosure. The example shown includes plain text 600 and formatted document 605. Text processing apparatus 110 of FIG. 1 generates formatted document 605 based on plain text 600. Plain text 600 does not include style annotations. That is, plain text 600 is an un-styled document. According to an embodiment, text processing apparatus 200 of FIG. 2 takes plain text 600 as an input and generates formatted document 605. Formatted document 605 includes styled layout and contains style information (e.g., heading, list, paragraph, other structural classes). Accordingly, users can focus on editing content of formatted document 605 and text processing efficiency is increased.

Figure 7:
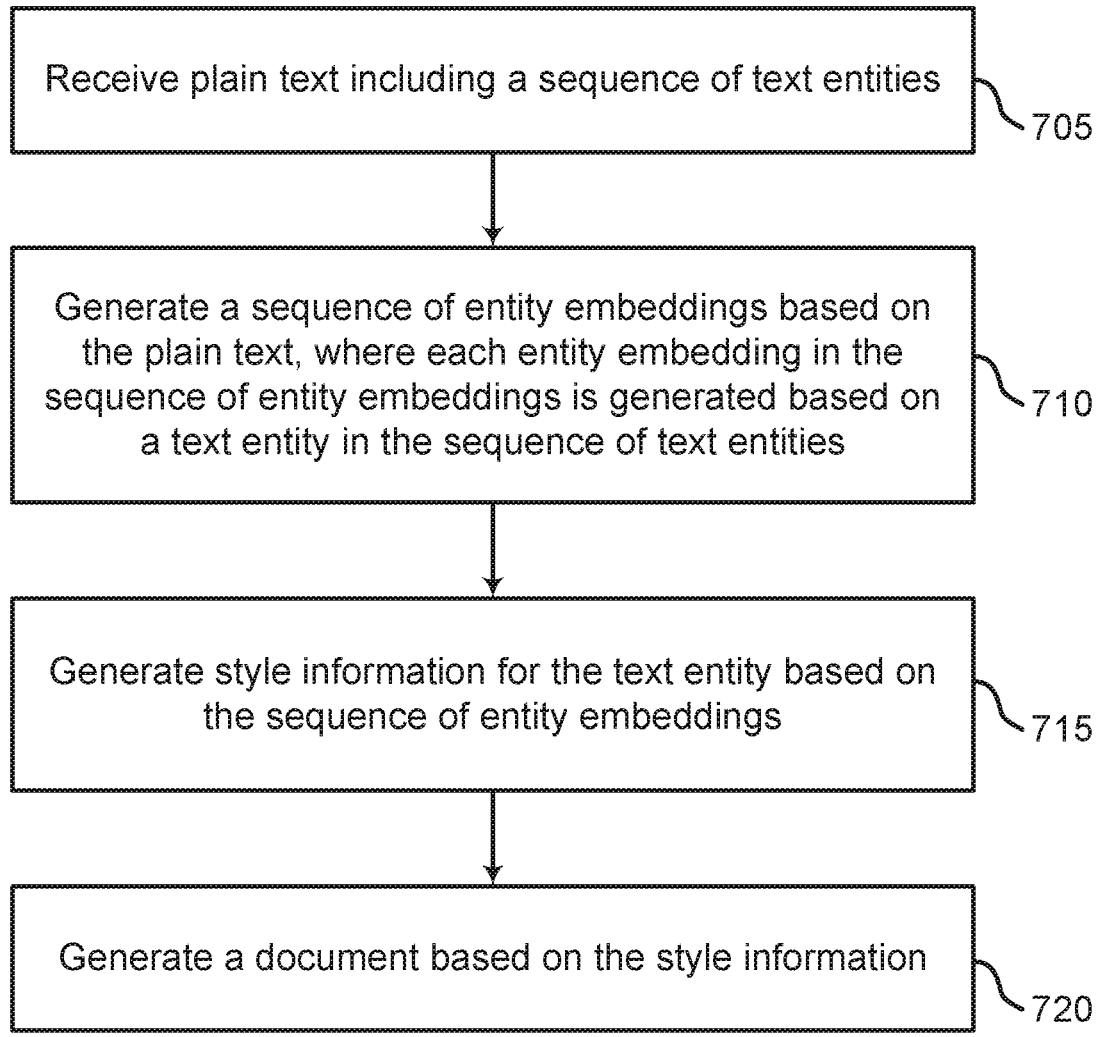
FIG. 7 shows an example of a method for generating style information based on plain text according to aspects of the present disclosure.

FIG. 7 shows an example of a method for generating style information based on plain text according to aspects of the present disclosure. In some examples, these operations are performed by a system including a processor executing a set of codes to control functional elements of an apparatus, such as the text processing apparatus described in FIGS. 1 and 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives plain text including a sequence of text entities. In some cases, the operations of this step refer to, or may be performed by, a machine learning model as described with reference to FIGS. 2, 3, and 11. Plain text does not any structure annotations or style annotations. In some examples, each text entity includes one or more sentences or segments (e.g., a paragraph containing multiple sentences).

At operation 710, the system generates a sequence of entity embeddings based on the plain text, where each entity embedding in the sequence of entity embeddings is generated based on a text entity in the sequence of text entities. Detail regarding generating an entity embedding based on a token embedding will be described in FIG. 8. Detail regarding generating a segment embedding will be described in FIG. 9. In some cases, the operations of this step refer to, or may be performed by, a machine learning model as described with reference to FIGS. 2, 3, and 11. In an embodiment, a lower layer of the machine learning model is configured to generate a sequence of entity embeddings based on a sequence of text entities in plain text. Each entity embedding in the sequence of entity embeddings is generated based on a text entity in the sequence of text entities. The lower layer comprises a base transformer model. In some examples, base transformer model is BERT-base model having 12 encoder layers. Each encoder layer is a transformer layer comprising multi-headed self-attention, layer normalization, and a feed forward layer. Detail regarding the lower layer of the machine learning model is further described in FIG. 3.

At operation 715, the system generates style information for the text entity based on the sequence of entity embeddings. In some cases, the operations of this step refer to, or may be performed by, a machine learning model as described with reference to FIGS. 2, 3, and 11. In an embodiment, an upper layer of the machine learning model is configured to generate style information for the text entity based on the sequence of entity embeddings. The upper layer comprises two transformer layers (i.e., a first transformer layer and a second transformer layer). Detail regarding the upper layer of the machine learning model is further described in FIG. 3.

At operation 720, the system generates a document based on the style information. In some cases, the operations of this step refer to, or may be performed by, a document generation component as described with reference to FIGS. 2 and 4. In an embodiment, a document generation component is configured to generate a formatted document based on the style information. The formatted document includes heading, list, and/or paragraph elements. In some examples, a template selection component is configured to select a template from a set of document templates (e.g., style templates). The formatted document is generated based in part on the selected template.

Figure 8:
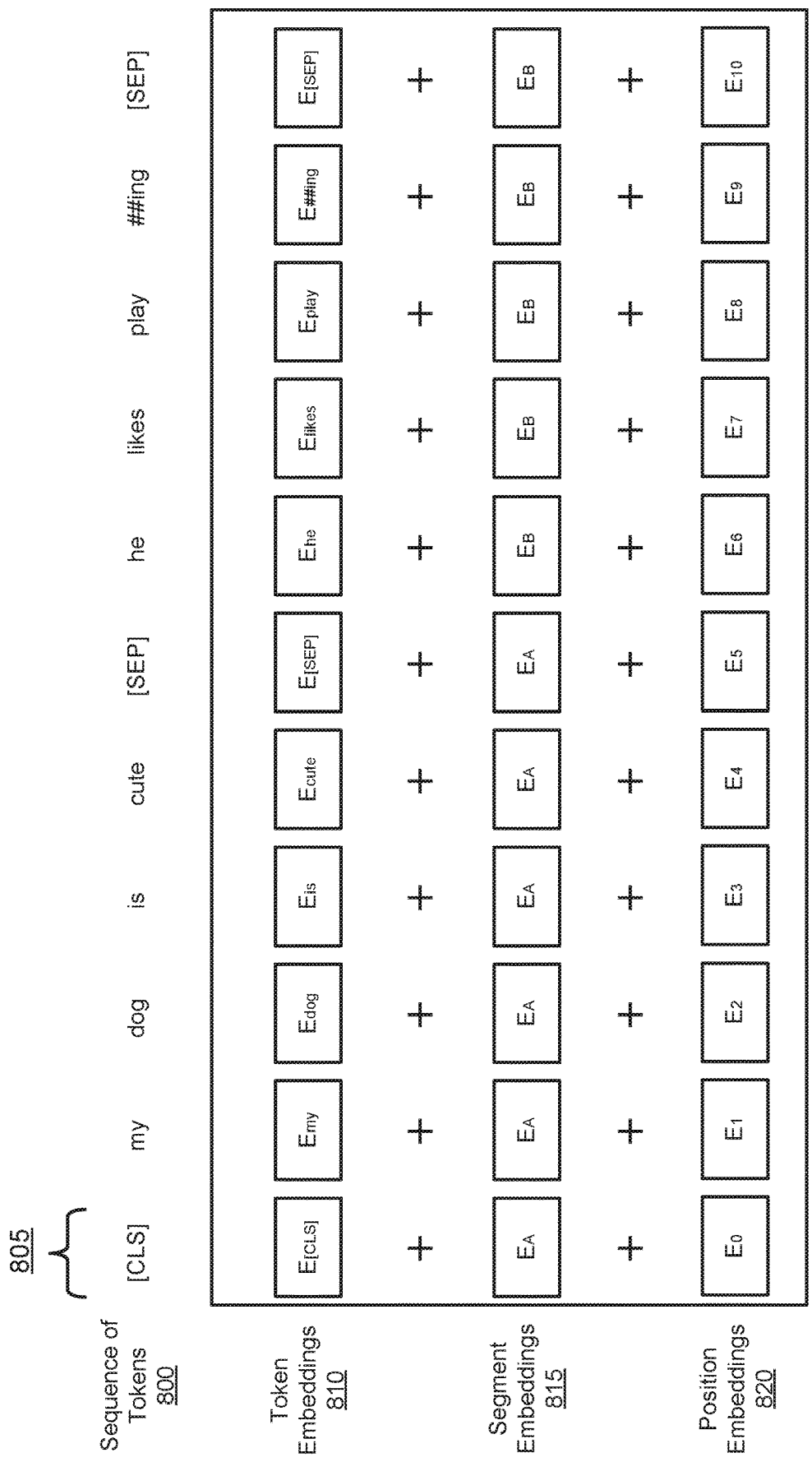
FIG. 8 shows an example of generating an entity embedding based on a token embedding according to aspects of the present disclosure.

FIG. 8 shows an example of for generating an entity embedding based on a token embedding according to aspects of the present disclosure. The example shown includes sequence of tokens 800, class identification token 805, token embeddings 810, segment embeddings 815, and position embeddings 820.

According to an embodiment, machine learning model 225 (FIG. 2) is based on a bidirectional encoder representations from transformers (BERT) architecture. In some examples, BERT is used as a language representation model, and is configured to pretrain deep bidirectional representations from unlabeled text by jointly conditioning on both left and right context in all layers. As a result, the pre-trained BERT model can be finetuned with an additional output layer to create network models for specific tasks (e.g., question answering and language inference).

In some examples, BERT uses a masked language model (MLM or Masked LM) pre-training objective to alleviate the unidirectionality constraint. The masked language model randomly masks some of the tokens from the input, and the objective is to predict the original vocabulary id of the masked word based only on its context. Unlike left-to-right language model pre-training, the MLM objective enables the representation to fuse the left and the right context, which pretrains a deep bidirectional transformer. In addition to the masked language model, BERT includes a next sentence prediction (NSP) task that jointly pretrains text-pair representations.

A BERT model may also be applied to a recommendation task. A BERT recommendation network may learn based on a bidirectional model, while other sequential networks are limited to left-to-right unidirectional models which predict next item sequentially. For example, a two-layer transformer decoder (i.e., Transformer language model) may be used to capture user's sequential behaviors (i.e., for sequential recommendation). In some cases, a transformer model may be a unidirectional model using a casual attention mask.

According to an embodiment, the machine learning model divides a text entity of a sequence of text entities into a sequence of tokens 800. The machine learning model generates a token embedding 810 for a token in the sequence of tokens 800. Additionally, the machine learning model generates a position embedding 820 for the token, where the entity embedding is based on the token embedding 810 and the position embedding 820. The machine learning model adds a class identification token 805 to the sequence of tokens 800, where the entity embedding is based on the class identification token 805. In some examples, a [CLS] token is inserted at the beginning of the first sentence and a [SEP] token is inserted at the end of each sentence. This way, the machine learning model can distinguish between the two sentences in training.

In some examples, a segment embedding 815 indicating segment A or segment B is added to each token. Segment embeddings are similar in concept to token embeddings with a vocabulary of 2. In some examples, a position embedding 820 is added to each token to indicate its position in the sequence.

In some embodiments, BERT model embeddings for every token are a sum of token embeddings 810, segment embeddings 815, and position embeddings 820. The machine learning model generates alternate segment embeddings (e.g., $E_A E_A E_A E_A E_B E_B E_B E_B E_A E_A E_A E_A E_B E_B E_B E_B$) during joint training for multiple segments (i.e., two or more sentences). In some examples, the alternate segment embeddings 815 include two or more segments in the same text window. The alternate segment embeddings 815 may distinguish between separate segments when computing attention. The segment embeddings 815 are captured by the [CLS] token for every segment.

Figure 9:
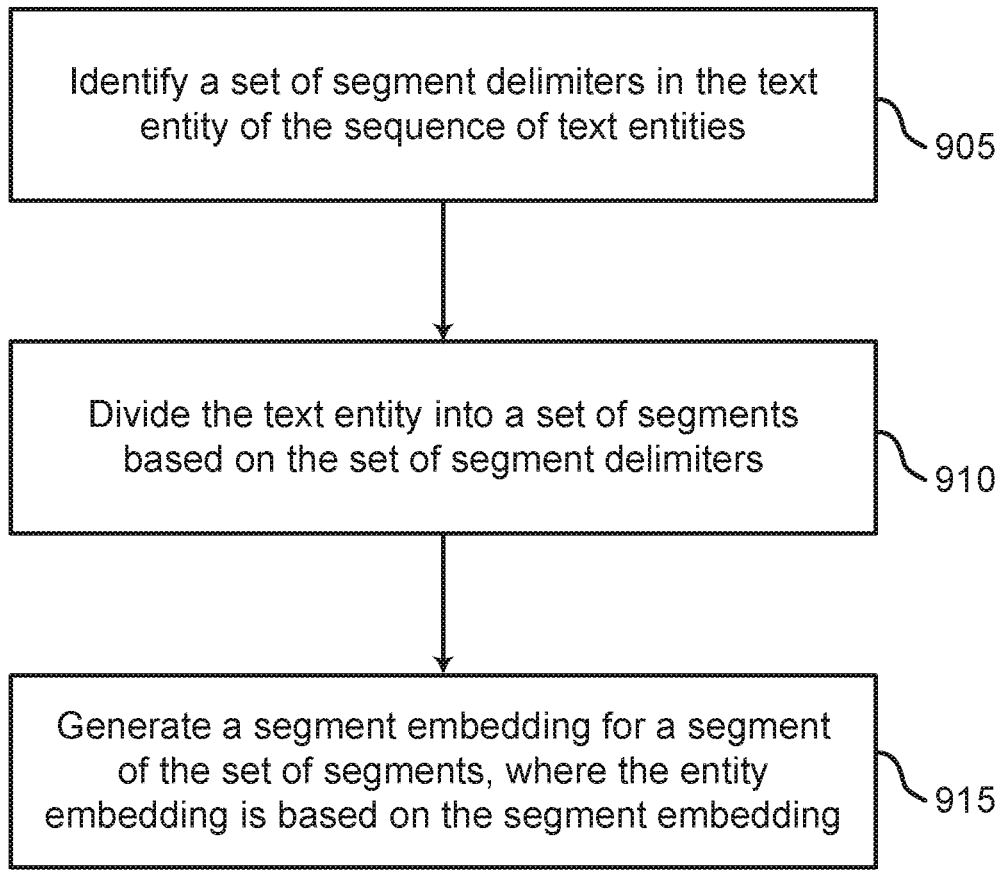
FIG. 9 shows an example of a method for generating a segment embedding according to aspects of the present disclosure.

FIG. 9 shows an example of a method for generating a segment embedding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies a set of segment delimiters in the text entity of the sequence of text entities. In some cases, the operations of this step refer to, or may be performed by, a machine learning model as described with reference to FIGS. 2, 3, and 11. In some examples, a text entity includes one or more sentences or segments (a text entity is a paragraph from a document). In some examples, the set of segment delimiters includes, but not limited to, breaks, periods, semicolons, or other punctuations.

At operation 910, the system divides the text entity into a set of segments based on the set of segment delimiters. In some cases, the operations of this step refer to, or may be performed by, a machine learning model as described with reference to FIGS. 2, 3, and 11.

At operation 915, the system generates a segment embedding for a segment of the set of segments, where the entity embedding is based on the segment embedding. In some cases, the operations of this step refer to, or may be performed by, a machine learning model as described with reference to FIGS. 2, 3, and 11. Referring to FIG. 8, the machine learning model generates alternate segment embeddings (e.g., $E_A E_A E_A E_A E_B E_B E_B E_B E_A E_A E_A E_A E_B E_B E_B E_B$) at training for multiple segments together (i.e., two or more sentences). In some examples, the alternate segment embeddings 815 include two or more segments from the same text window. The alternate segment embeddings 815 may distinguish between separate segments when computing attention. The segment embeddings 815 are captured by the [CLS] token for every segment.

Training

Figure 10:
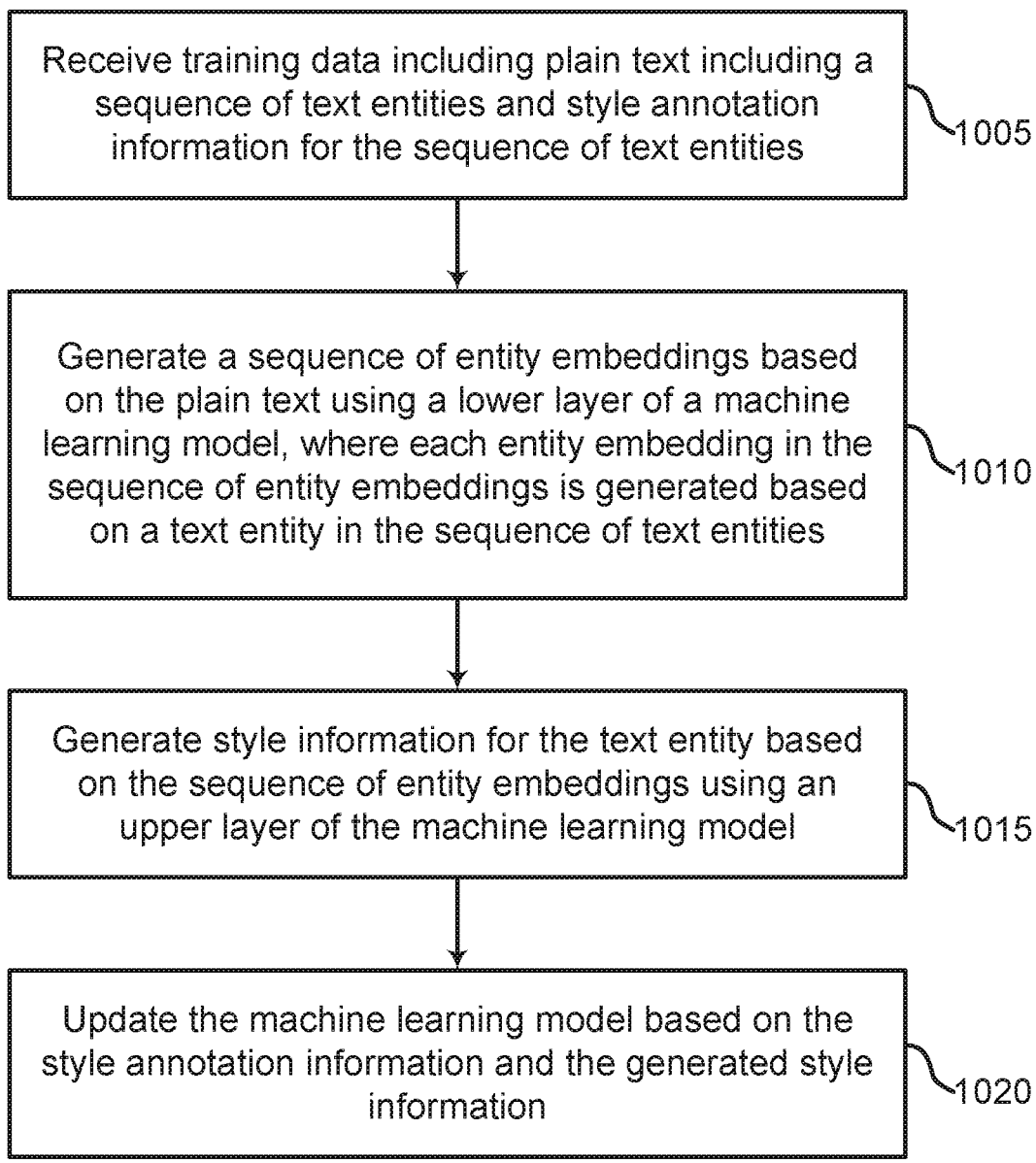
FIG. 10 shows an example of a method for training a machine learning model according to aspects of the present disclosure.
Figure 11:
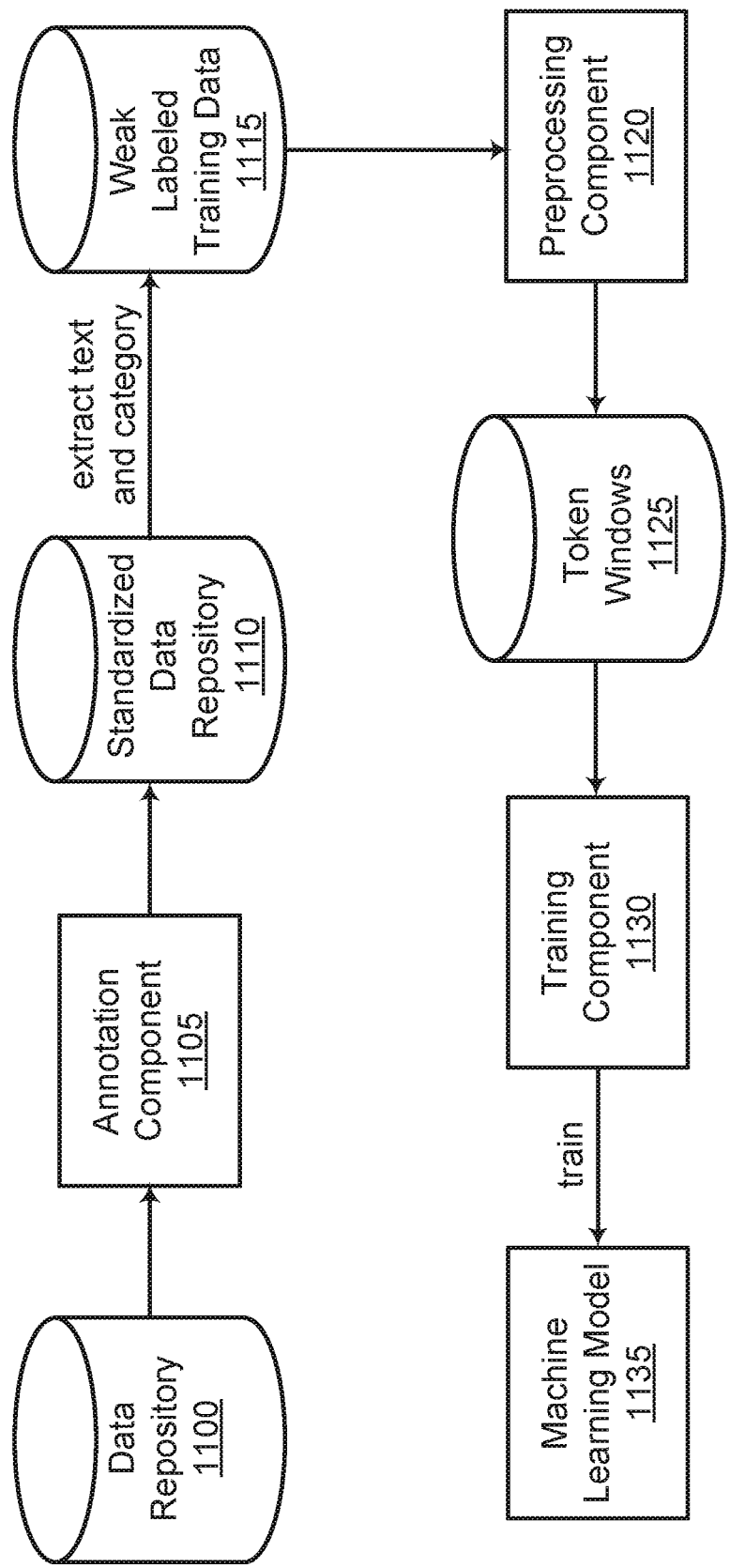
FIG. 11 shows an example of training a machine learning model for content autostyling according to aspects of the present disclosure.
Figure 12:
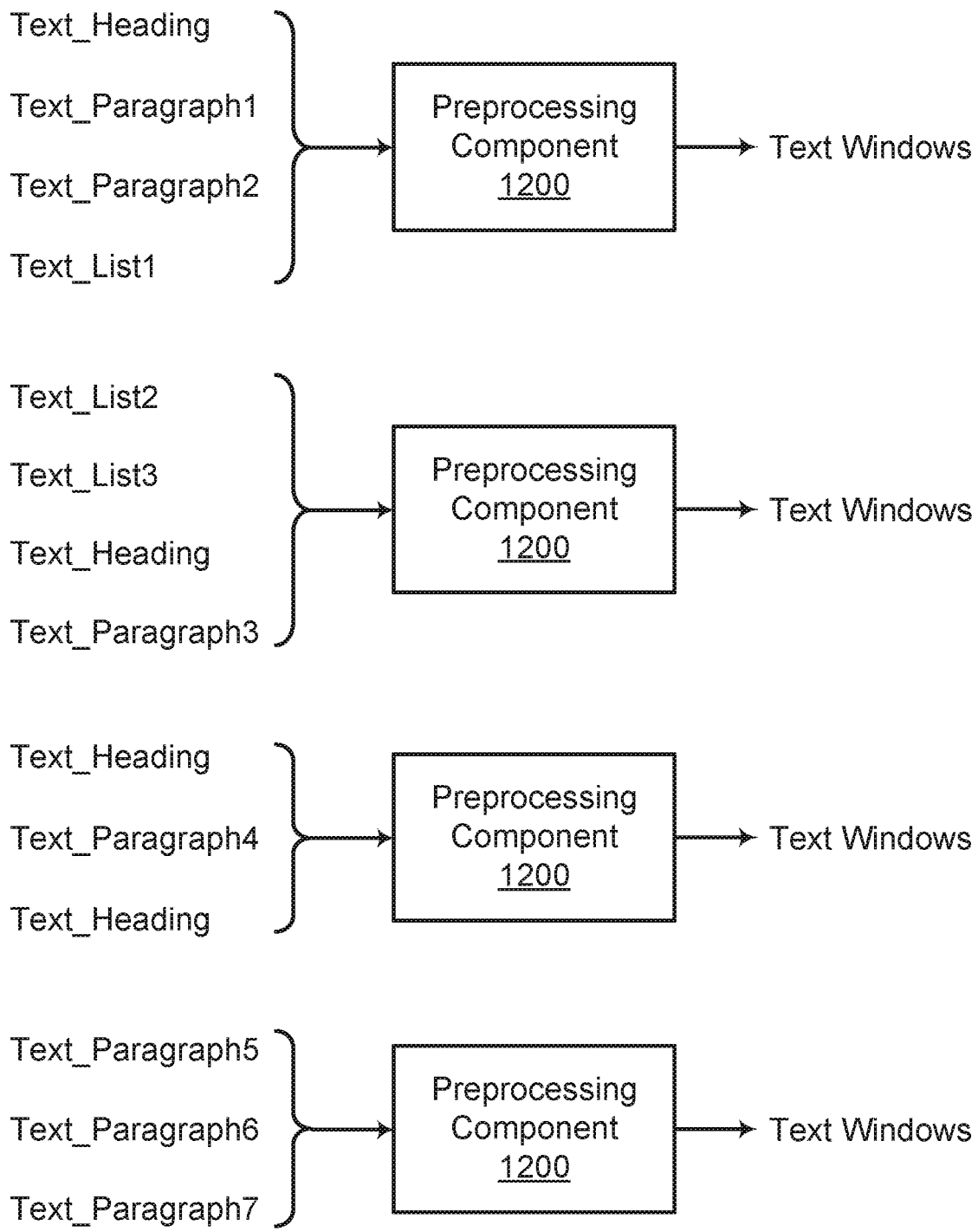
FIG. 12 shows an example of generating text windows according to aspects of the present disclosure.

In FIGS. 10-12, a method, apparatus, and non-transitory computer readable medium for training a machine learning model are described. One or more embodiments of the method, apparatus, and non-transitory computer readable medium include receiving training data including plain text comprising a sequence of text entities and style annotation information for the sequence of text entities; generating a sequence of entity embeddings based on the plain text using a lower layer of a machine learning model, wherein each entity embedding in the sequence of entity embeddings is generated based on a text entity in the sequence of text entities; generating style information for the text entity based on the sequence of entity embeddings using an upper layer of the machine learning model; and updating the machine learning model based on the style annotation information and the generated style information.

Some examples of the method, apparatus, and non-transitory computer readable medium further include identifying the plain text and the style annotation information from a styled document.

Some examples of the method, apparatus, and non-transitory computer readable medium further include performing text recognition on the styled document to obtain the plain text.

Some examples of the method, apparatus, and non-transitory computer readable medium further include performing style extraction on the styled document to obtain the style annotation information.

Some examples of the method, apparatus, and non-transitory computer readable medium further include computing a cross-entropy loss function based on the style information and the style annotation information, wherein parameters of the machine learning model are updated based on the cross-entropy loss function.

FIG. 10 shows an example of a method for training a machine learning model according to aspects of the present disclosure. Referring to at least FIG. 2, training component 220 is configured to train machine learning model 225. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data comprising a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1005, the system receives training data including plain text including a sequence of text entities and style annotation information for the sequence of text entities. In some cases, the operations of this step refer to, or may be performed by, a training component as described with reference to FIGS. 2 and 11.

In some examples, the training data includes approximately 150 k Indesign pdfs from data repository (e.g., Deep Reservoir) for training the machine learning model. Training and validation split is 90:10. In some examples, a PDF extract service obtains structural annotation from structured and formatted PDFs to create weak-labeled training data. The PDF extract service generates plain text after performing optical character recognition (OCR) and corresponding structural entity associated with the plain text (i.e., title, heading 1, heading 2, list 1, list 2, paragraph, etc.) in a json format for every PDF. In some cases, the json output includes font, coordinates, and other formatting signals.

At operation 1010, the system generates a sequence of entity embeddings based on the plain text using a lower layer of a machine learning model, where each entity embedding in the sequence of entity embeddings is generated based on a text entity in the sequence of text entities. In some cases, the operations of this step refer to, or may be performed by, a machine learning model as described with reference to FIGS. 2, 3, and 11.

At operation 1015, the system generates style information for the text entity based on the sequence of entity embeddings using an upper layer of the machine learning model. In some cases, the operations of this step refer to, or may be performed by, a machine learning model as described with reference to FIGS. 2, 3, and 11.

At operation 1020, the system updates the machine learning model based on the style annotation information and the generated style information. In some cases, the operations of this step refer to, or may be performed by, a training component as described with reference to FIGS. 2 and 11.

FIG. 11 shows an example of for training a machine learning model for content autostyling according to aspects of the present disclosure. Training process and methods described in FIG. 10 is applied herein to train machine learning model 1135. The example shown includes data repository 1100, annotation component 1105, standardized data repository 1110, weak labeled training data 1115, preprocessing component 1120, token windows 1125, training component 1130, and machine learning model 1135.

In some examples, data repository 1100 includes a crawled-data repository of open-source PDFs (e.g., Deep Reservoir). Annotation component 1105 is configured to generate weak labeled training data. Annotation component 1105 includes PDF extract/annotation service. For example, approximately 150 k Indesign pdfs from Deep Reservoir may be used for training machine learning model 1135. Training and validation is implemented as 90-10 split. In some examples, a PDF extract service from Doc Cloud can be used to obtain structural annotation from the well-structured and formatted PDFs to create weak-labeled training data from the PDFs. The output from PDF extract service is OCR plain text and the corresponding structural entity associated with the plain text e.g., title, heading1, heading2, list1, list2, para1, para2, etc.) in a json format for each PDF. In some cases, the json output includes font, coordinates, and other formatting signals.

Preprocessing component 1120 is configured to exclude table and image data during preprocessing and training data preparation phase. At training, the structural entities are mapped to heading, paragraph, list, and other classes. Machine learning model 1135 generates a set of text windows per each PDF with a maximum window size of 512 tokens. Detail regarding generating text windows will be described in FIG. 12. The base minimum entity in a window can be either a sentence or a section. A section includes multiple sentences or paragraphs. Preprocessing component 1120 is an example of, or includes aspects of, the corresponding element described with reference to FIG. 12.

Training component 1130 is an example of, or includes aspects of, the corresponding element described with reference to FIG. 2. Machine learning model 1135 is an example of, or includes aspects of, the corresponding element described with reference to FIGS. 2 and 3.

FIG. 12 shows an example of for generating text windows according to aspects of the present disclosure. Training machine learning model 225 of FIG. 2 involves identifying a text window comprising one or more text entities. Preprocessing component 1200 is an example of, or includes aspects of, the corresponding element described with reference to FIG. 11.

According to an embodiment, structural entities are mapped to heading, paragraph, list, and other classes. The machine learning model generates a set of text windows per PDF document with a maximum window size of 512 tokens. The base minimum entity in a window can be either a sentence or a section (i.e., a section includes multiple sentences or paragraphs). As an example illustrated in FIG. 12, preprocessing component 1200 takes text corresponding to heading, paragraph 1, paragraph 2, and list 1 as input. Preprocessing component 1200 is configured to generate a text window based on the text. Additionally, preprocessing component 1200 takes additional text corresponding to list 2, list 3, heading, and paragraph 3 as input. Preprocessing component 1200 generates an additional text window based on the additional text.

Referring to FIG. 3, running machine learning model 300 over text windows helps add context for model prediction. Context coverage is increased. In an embodiment, base transformer 315 generates entity embedding based on a text entity in a sequence of text entities where the entity embedding captures context within each text entity. Next, upper layer 310 of machine learning model 300 attends over a sequence of entity embeddings. Upper layer 310 captures context across multiple different text entities in a window. The layered context is used to generate model prediction.

In some examples, a text window comprises one or more text entities and is input to base transformer 315, which generates an entity embedding based on respective text entity. Each text entity can include multiple sentences/segments (e.g., a paragraph).

Performance of apparatus, systems and methods of the present disclosure have been evaluated, and results indicate embodiments of the present disclosure have obtained increased performance over existing technology. Example experiments demonstrate that the text processing apparatus and systems described in the present disclosure outperform conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing (NLP), comprising:
   receiving plain text comprising a sequence of text entities;
   generating a sequence of entity embeddings based on the plain text, wherein each entity embedding in the sequence of entity embeddings is generated based on a text entity in the sequence of text entities;
   generating style information for the text entity based on the sequence of entity embeddings, wherein the style information includes a probability value for each of a plurality of style classes; and
   generating a document that includes the plain text formatted according to the style information.

2. The method of claim 1, further comprising:
   identifying a plurality of entity delimiters in the plain text; and
   dividing the plain text into a plurality of text entities based on the plurality of entity delimiters, wherein the sequence of text entities includes an ordering of the plurality of text entities.

3. The method of claim 1, wherein:
   the plain text does not include style annotations.

4. The method of claim 1, further comprising:
   dividing the text entity of the sequence of text entities into a sequence of tokens; and
   generating a token embedding for a token in the sequence of tokens, wherein the entity embedding is based on the token embedding.

5. The method of claim 4, further comprising:
   generating a position embedding for the token, wherein the entity embedding is based on the position embedding.

6. The method of claim 4, further comprising:
   adding a class identification token to the sequence of tokens, wherein the entity embedding is based on the class identification token.

7. The method of claim 1, further comprising:
   identifying a plurality of segment delimiters in the text entity of the sequence of text entities;
   dividing the text entity into a plurality of segments based on the plurality of segment delimiters; and
   generating a segment embedding for a segment of the plurality of segments, wherein the entity embedding is based on the segment embedding.

8. The method of claim 1, further comprising:
   selecting a style for the text entity; and
   generating a style tag for the text entity based on the selected style, wherein the document includes the style tag.

9. The method of claim 1, further comprising:
   selecting a template from a plurality of document templates, wherein the document is based on the selected template.

10. An apparatus for natural language processing (NLP), comprising:
    a lower layer of a machine learning model configured to generate a sequence of entity embeddings based on a sequence of text entities in plain text, wherein each entity embedding in the sequence of entity embeddings is generated based on a text entity in the sequence of text entities;
    an upper layer of the machine learning model configured to generate style information for the text entity based on the sequence of entity embeddings, wherein the style information includes a probability value for each of a plurality of style classes; and
    a document generation component configured to generate a document based on the style information.

11. The apparatus of claim 10, wherein:
    the lower layer of the machine learning model and the upper layer of the machine learning model comprise a different number of attention heads.

12. The apparatus of claim 10, further comprising:
    a template selection component configured to select a template from a plurality of document templates, wherein the document is based on the selected template.

13. The apparatus of claim 10, further comprising:
    a document extraction component configured to perform text recognition on a styled document to obtain the plain text, to perform style extraction on the styled document to obtain style annotation information, or both.

* * * * *